United States Patent Office 3,037,874
Patented June 5, 1962

3,037,874
METHOD OF PREPARING CERAMIC COMPOSITIONS
Lawrence P. Garvey, Livingston, N.J., assignor to Radio Corporation of America, a corporation of Delaware
No Drawing. Filed Dec. 7, 1959, Ser. No. 857,478
6 Claims. (Cl. 106—39)

This invention relates to ceramic compositions and improved methods of fabricating them. More particularly, it relates to improved ceramic insulating materials of the type used, for example, in electron discharge devices.

Some of the parts of electron discharge devices are usually made of a ceramic. Ceramics are generally employed for such parts as electron tube spacing members, tube stems, and tube envelopes because they can be fabricated to exhibit a combination of desirable qualities, such as high mechanical strength, low dielectric constant, and high resistance to heat and shock.

Ceramics are commonly made by milling metal oxides dispersed in water to the desired particle size, and mixing the powdered oxides, which may include for example aluminum oxide, magnesium oxide, calcium oxide, and beryllium oxide, with a binder. The resulting mixture is pressed into a part of the desired shape, and is then fired at high temperatures for several hours to vitrify the particles of the mixture. The pressed part must be made larger than the finished size desired, since the part shrinks during the vitrification step. The density of the part also increases during this step. For mass production of ceramic electron tube parts, it is highly desirable that the finished parts be interchangeably uniform as to size and density. For small parts, it is also desirable that the shrinkage in size be minimized. It has hitherto been very difficult to achieve such uniformity in shrinkage and density of fired ceramic parts when the ceramic includes a constituent an alkaline earth oxide such as calcium oxide and magnesium oxide, or a mixture of such oxides. These alkaline earth oxides tend to take up a variable amount of water during processing, and this water is subsequently driven off during the firing step. As a result, the loss of weight of the fired part is variable, and hence the decrease in volume and change in density of the finished part is also variable.

Attempts have been made to circumvent this difficulty by utilizing the completely hydrated form of the alkaline earth oxide. For example, ceramics have been prepared with magnesium hydroxide instead of magnesium oxide. However, this has not been satisfactory since magnesium hydroxide loses a molecule of water when fired, and the shrinkage in volume of the finished part is thereby increased to at least 20 percent and more. In fact, the more hydrated the ingredients of a ceramic batch, the greater the shrinkage of the fired ceramic.

Ceramic compositions containing alkaline earth oxides have also been prepared by milling the dry ingredients without any water present. However, ceramic parts thus made are not as mechanically strong as desirable, and have greater internal porosity than desirable.

It is therefore an object of this invention to provide an improved method of making ceramic bodies which include an alkaline earth oxide as a constituent.

Another object of the invention is to provide an improved ceramic body which exhibits low shrinkage after firing.

Yet another object of the invention is to provide an improved ceramic composition which exhibits uniform shrinkage after firing.

But another object of the invention is to provide an improved ceramic body which exhibits a uniform change in density and a high modulus of rupture after firing.

These and other objects and advantages are attained in accordance with the invention by preparing a ceramic slip containing at least one alkaline earth oxide as follows. First, the alkaline earth oxide or mixture of the oxides is milled to the desired particle size in an organic medium selected from the group consisting of alcohols, ethers, esters, and ketones having 3 to 6 carbon atoms per molecule. This milling of the alkaline earth oxides is continued until the material all passes through a 325 mesh screen. The alkaline earth oxide or mixture of oxides is then dried, and blended with the other constituents of the ceramic by milling all the ingredients together in an organic medium selected from the above group. Suitable milling media include for example propanol, butanol, acetone, diacetone alcohol, ethyl acetate, and ethylene glycol monoethyl ether. Normal butanol and ethylene glycol monoethyl ether have been found to be particularly satisfactory as milling media in that they exhibit relatively high flash point and low toxicity.

A feature of the invention is that the amount of moisture taken up by the alkaline earth oxide ingredients, and subsequently lost during the firing step, is substantially minimized.

Another feature is that the modulus of rupture of ceramic compositions containing alkaline earth oxides and greater than that of similar compositions milled while dry for the same period of time.

The invention will be described in greater detail in the following example of the preparation of an electron tube stem composed of a ceramic of the forsterite type, which includes magnesium oxide as one constituent. It will be understood that the method of the invention is equally applicable to other types of ceramic compositions which include as a constituent at least one alkaline earth oxide.

*Example*

A suitable grade of magnesium oxide is Norton Company Fused Magnorite, refractory grade, which is obtained in the form of a powder that will completely pass through a 220 mesh screen. The average diameter of the powder particles is about 55 microns. About 4000 grams of the Norton fused Magnorite and 4000 cc. of n-butyl alcohol are poured into a three gallon ball mill containing 6000 grams of porcelain balls having a diameter of ¾ inch to 1 inch. The mixture is milled for 30 hours, thereby reducing the size of the magnesium oxide particles to an average diameter of about 7 microns. All of the Magnorite is thus made sufficiently fine to pass through a 325 mesh screen. The mixture is poured in a beaker, allowed to settle at least 4 hours, and the excess alcohol is siphoned off. The mixture is then evaporated on a hot plate to dryness.

Next, 894 grams of the ball milled magnesium oxide is placed in a three gallon ball mill together with 1692 grams Montana 486 talc, 258 grams P–256 Clinchfield feldspar, 156 grams New Kentucky special ball clay, and 300 grams barium carbonate. The total weight of the above ingredients is 3300 grams. The mill contains 6000 grams of porcelain balls having a diameter of ¾ inch to 1 inch. About 4000 cc. of n-butyl alcohol is added, and the ingredients are blended by ball milling them together for 6 hours. The resulting mixture, known as a slip, is a suspension of the solid powder in the liquid medium. The blended suspension or slip is allowed to settle overnight in a beaker, and the excess alcohol is decanted. The mixture is then dried on a hot plate. The average particle size is now about 6 microns, with about 99 percent by weight of the material varying between one and 30 microns in diameter.

About 3000 grams of the dried blend are now mixed with a binder, which may for example be a polyethylene glycol or the like. A suitable material is that polyethylene glycol which is commercially available as Carbowax 4000. A mixture of 120 grams Carbowax 4000, 45 grams trigamine stearate, and 900 cc. water has been found satisfactory as the binder in this example. The blend and the binder are mixed in a Simpson mixer for about 40 minutes to make the mixture moldable. The mixture is dried for 2 hours at 75° C., shredded in a Hobart food chopper, and dried again for about one hour at 75° C. The mixture is then placed in a Stokes oscillating granulator and the material is forced through a 20 mesh screen. The material is then dried, and placed in a gyratory sifter to select the fraction which passes through a 40 mesh screen but is retained on a 100 mesh screen. The fraction selected for use depends on the size of the part to be made. For small parts, it is preferable to use fractions containing finer particles. The fraction selected is dried overnight at 75° C.

The dried fraction is now pressed into parts of the desired shape. In this example, the pressed part is an external base stem in the shape of a disc .076 to .078 inch thick and .452 inch in diameter. A high pressed density is desirable in order to minimize firing shrinkage. Upper limits to the pressed density are set by the deforming pressure on the material. If the pressed density is too high, the material will abrade and wear out the dies. In the present example, it has been found that a pressed density of 2.29 grams per cubic centimeter is a practical upper limit for parts having the composition recited.

The pressed part is now heated in air for about 6½ hours until a temperature of 1385° C. is attained, then slowly cooled overnight to 200° C. After this firing step, the finished base stem has shrunk to a diameter of .400±.002 inch and a thickness of .066±.002 inch.

Tests have shown that the average modulus of rupture of ceramic parts prepared as described above is about 22,000 pounds per square inch. In comparison, it was found that the identical ceramic composition, when dry milled as in the prior art method for the same period of time, exhibited a modulus of rupture of only about 12,000 to 14,000 pounds per square inch.

A considerable improvement in the microstructure of the ceramic prepared according to the invention is also noted. The ceramic which was dry milled exhibited very high internal porosity which was unevenly distributed. The dry-milled ceramic also contained large amounts of glass and an absence of crystal-to-crystal contact, resulting in the poor mechanical strength which was observed. The dry-milled ceramic contained large amounts of free unreacted magnesium oxide, and after firing had a relatively low density of about 2.85 grams per cubic inch.

In contrast, the sample made as described in the above invention exhibited low porosity evenly distributed, and a small amount of glass. Crystal-to-crystal contact was evident, mechanical strength was high as shown by the increased modulus of rupture, and there was essentially no free unreacted magnesium oxide in the material. The density after firing was in the relatively high range of 2.94 to 3.02 grams per cubic centimeter.

Although in the above example butanol was used as the milling medium for both the alkaline earth oxide and the slip, it will be understood that the milling medium need not be the same for both steps. It will also be understood that branched chain compounds such as isopropanol are equally suitable for the practice of the invention. Furthermore, the compound selected may contain more than one of the active oxygen-containing radical —OH, —C=O, —C—(O)—OH, and —C—O—C—. The organic compound utilized may, for example, be a glycol containing two hydroxyl radicals, or may contain two different oxygen-containing radicals. Examples of the latter compounds are diacetone alcohol, $(CH_3)_2C(OH)CH_2COCH_3$ which is both a ketone and an alcohol, and ethylene glycol monethyle ether, $CH_2H_5OCH_2CH_2OH$, which is both an ether and an alcohol. In this application and in the appended claims, the terms alcohol, ether, ester, and ketone are to be understood as including the substituted compounds which contain more than one active oxygen-containing radical selected from the group consisting of —OH, —C=O, —C(O)OH, and —C—O—C—.

It will be appreciated that the above example was by way of illustration only, and many modifications and variations of the process may be made without departing from the spirit and scope of the invention.

What is claimed is:

1. The method of preparing a ceramic slip containing at least one alkaline earth oxide, comprising the steps of milling said oxide in an organic milling medium, drying said oxide, and blending said dried oxide with the other constituents of said ceramic by milling them together in an organic milling medium, said organic milling medium being selected from the group consisting of alcohols, ethers, esters, and ketones having 3 to 6 carbon atoms per molecule.

2. The method of preparing a ceramic slip containing at least one alkaline earth oxide, comprising the steps of milling said oxide in an organic milling medium, drying said oxide, and blending said dried oxide with the other constituents of said ceramic by milling them together in an organic milling medium, said organic milling medium consisting of butanol.

3. The method of preparing a ceramic slip containing an alkaline earth oxide, comprising the steps of milling said oxide in an organic milling medium until all of said oxide will pass through a 325 mesh screen, drying said oxide, and blending said dried oxide with the other constituents of said ceramic by milling them together in an organic milling medium, said organic milling medium being selected from the group consisting of alcohols, ethers, esters, and ketones having 3 to 6 carbon atoms per molecule.

4. The method of preparing a ceramic slip containing at least one of the oxides of magnesium and calcium, comprising the steps of milling said oxide in an organic milling medium until all of said oxide will pass through a 325 mesh screen, drying said oxide, and blending said dried oxide with the other constituents of said ceramic by milling them together in an organic milling medium, said organic milling medium being selected from the group consisting of alcohols, ethers, esters, and ketones having 3 to 6 carbon atoms per molecule.

5. The method of preparing a ceramic slip containing at least one of the oxides of magnesium and calcium, comprising the steps of milling said oxide in an organic milling medium until all of said oxide will pass through a 325 mesh screen, drying said oxide, and blending said dried oxide with the other constituents of said ceramic by milling them together in an organic milling medium, said organic milling medium consisting of ethylene glycol monoethyl ether.

6. The method of preparing a ceramic containing at least one alkaline earth oxide, comprising the steps of milling said oxide in an organic milling medium until all of said oxide will pass through a 325 mesh screen, said milling medium being selected from the group consisting of alcohols, ethers, esters, and ketones having 3 to 6 carbon atoms per molecule, drying said oxide, blending said dried oxide with the other constituents of said ceramic by milling them together in an organic milling medium, drying said blend, mixing said dried blend with a binder, drying the mixture of said binder and said blend, removing the fraction of said dried mixture which passes through a 40 mesh screen but is retained on a 100 mesh screen, pressing said fraction into a part of the desired size and shape, and firing said part.

(References on following page)

References Cited in the file of this patent

UNITED STATES PATENTS

| | | |
|---|---|---|
| 2,238,540 | Sourwine | Apr. 15, 1941 |
| 2,636,244 | Williams | Apr. 28, 1953 |
| 2,705,204 | Tzu En Shen et al. | Mar. 29, 1955 |
| 2,729,757 | Goodman | Jan. 3, 1956 |
| 2,768,901 | Tombs | Oct. 30, 1956 |

FOREIGN PATENTS

| | | |
|---|---|---|
| 699,089 | Great Britain | Oct. 28, 1953 |